(12) United States Patent
Tomatsu et al.

(10) Patent No.: US 12,361,583 B2
(45) Date of Patent: Jul. 15, 2025

(54) IMAGE ANALYSIS APPARATUS AND MONITORING SYSTEM

(71) Applicant: AISIN CORPORATION, Aichi (JP)

(72) Inventors: Yoshiaki Tomatsu, Kariya (JP); Takayuki Nakagome, Kariya (JP)

(73) Assignee: AISIN CORPORATION, Aichi (JP)

( * ) Notice: Subject to any disclaimer, the term of this patent is extended or adjusted under 35 U.S.C. 154(b) by 504 days.

(21) Appl. No.: 17/830,667

(22) Filed: Jun. 2, 2022

(65) Prior Publication Data
US 2022/0398765 A1 Dec. 15, 2022

(30) Foreign Application Priority Data

Jun. 14, 2021 (JP) ................................ 2021-098861

(51) Int. Cl.
*G06T 7/70* (2017.01)
*G06V 20/52* (2022.01)
*G06V 20/59* (2022.01)
*G06V 40/10* (2022.01)

(52) U.S. Cl.
CPC ............... *G06T 7/70* (2017.01); *G06V 20/53* (2022.01); *G06V 20/593* (2022.01); *G06V 40/10* (2022.01); *G06T 2207/30196* (2013.01)

(58) Field of Classification Search
CPC . G06T 7/70; G06T 2207/30196; G06V 40/10; G06V 20/593
See application file for complete search history.

(56) References Cited

U.S. PATENT DOCUMENTS

| | | | | |
|---|---|---|---|---|
| 10,783,761 | B2* | 9/2020 | Sakashita | G11B 27/28 |
| 11,151,858 | B2* | 10/2021 | Modiano | G08B 21/22 |
| 2016/0267759 | A1* | 9/2016 | Kerzner | H04N 7/181 |
| 2018/0357772 | A1* | 12/2018 | Takemura | G06V 20/58 |
| 2020/0380702 | A1* | 12/2020 | He | G06T 7/70 |
| 2021/0012480 | A1* | 1/2021 | Oami | H04N 23/60 |
| 2022/0036056 | A1 | 2/2022 | Sato et al. | |
| 2024/0054674 | A1* | 2/2024 | Murayama | G06T 7/73 |

FOREIGN PATENT DOCUMENTS

| | | | | |
|---|---|---|---|---|
| CN | 109087335 B | * | 2/2022 | ......... G06K 9/00228 |
| JP | 2011215787 A | * | 10/2011 | |
| JP | 2014-86971 A | | 5/2014 | |
| JP | 2019-128824 A | | 8/2019 | |
| JP | 2020-104680 A | | 7/2020 | |
| JP | 2020-177557 A | | 10/2020 | |
| JP | 2021-56885 A | | 4/2021 | |
| JP | 2021-71923 A | | 5/2021 | |

* cited by examiner

*Primary Examiner* — Shaghayegh Azima
(74) *Attorney, Agent, or Firm* — Sughrue Mion, PLLC

(57) ABSTRACT

An image analysis apparatus includes a person information acquisition unit configured to analyze a captured image of a monitored space imaged by a camera so as to acquire information of a person imaged in the captured image, and a hidden state detection unit configured to detect occurrence of a hidden state in which a plurality of the persons are imaged to overlap in the captured image.

7 Claims, 14 Drawing Sheets

IMAGE ANALYSIS APPARATUS AND MONITORING SYSTEM

CROSS REFERENCE TO RELATED APPLICATIONS

This application is based on and claims priority under 35 U.S.C. § 119 to Japanese Patent Application 2021-098861, filed on Jun. 14, 2021, the entire content of which is incorporated herein by reference.

TECHNICAL FIELD

This disclosure relates to an image analysis apparatus and a monitoring system.

BACKGROUND DISCUSSION

In the related art, an image analysis apparatus is known that analyzes a captured image of a monitored space imaged by a camera so as to acquire information of a person imaged in the captured image. For example, JP 2020-104680A (Reference 1) discloses a configuration in which a vehicle interior of a vehicle is set as a monitored space, and a posture and a physique of an occupant imaged in a captured image by a camera are detected.

However, depending on a positional relationship with the camera, a person located in the monitored space may not be correctly imaged in the captured image. Thus, acquisition of information of the person may be hindered.

SUMMARY

According to an aspect of this disclosure, an image analysis apparatus includes: a person information acquisition unit configured to analyze a captured image of a monitored space imaged by a camera so as to acquire information of a person imaged in the captured image; and a hidden state detection unit configured to detect occurrence of a hidden state in which a plurality of the persons are imaged to overlap in the captured image.

According to another aspect of this disclosure, a monitoring system includes the image analysis apparatus according to any one of the above aspects.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an image analysis apparatus and a monitoring system will be described with reference to drawings.

Figure 1:
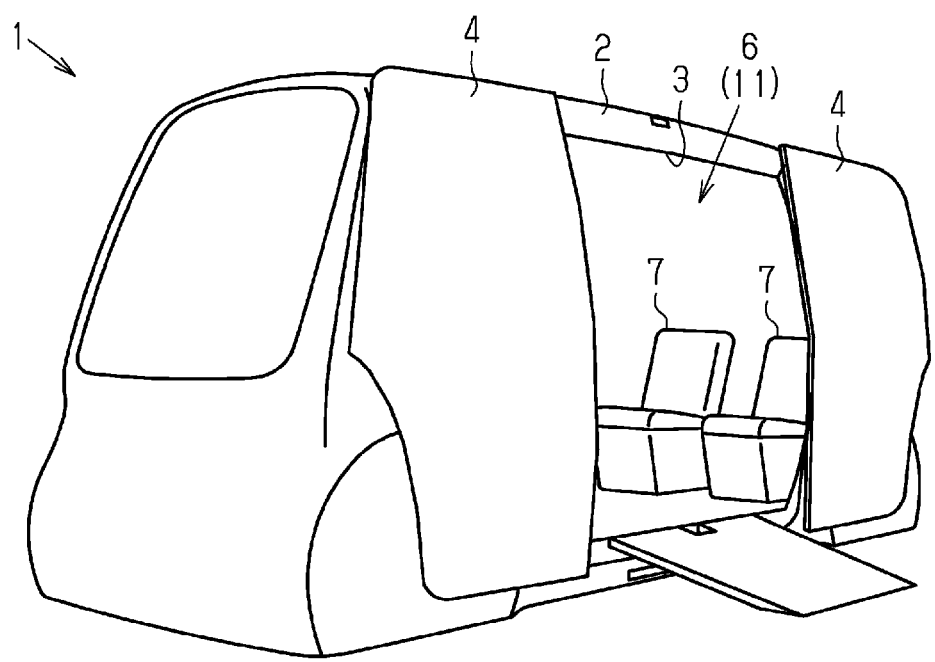
FIG. 1 is a perspective view of a vehicle to which a monitoring system is applied.
Figure 2:
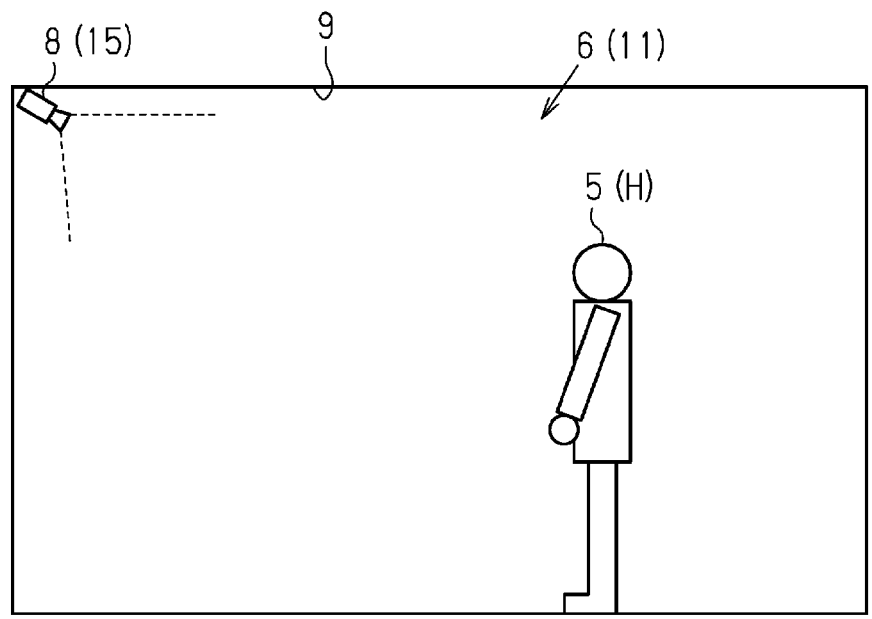
FIG. 2 is a diagram illustrating an occupant in a vehicle interior and a camera that captures an image of the occupant.
Figure 3:
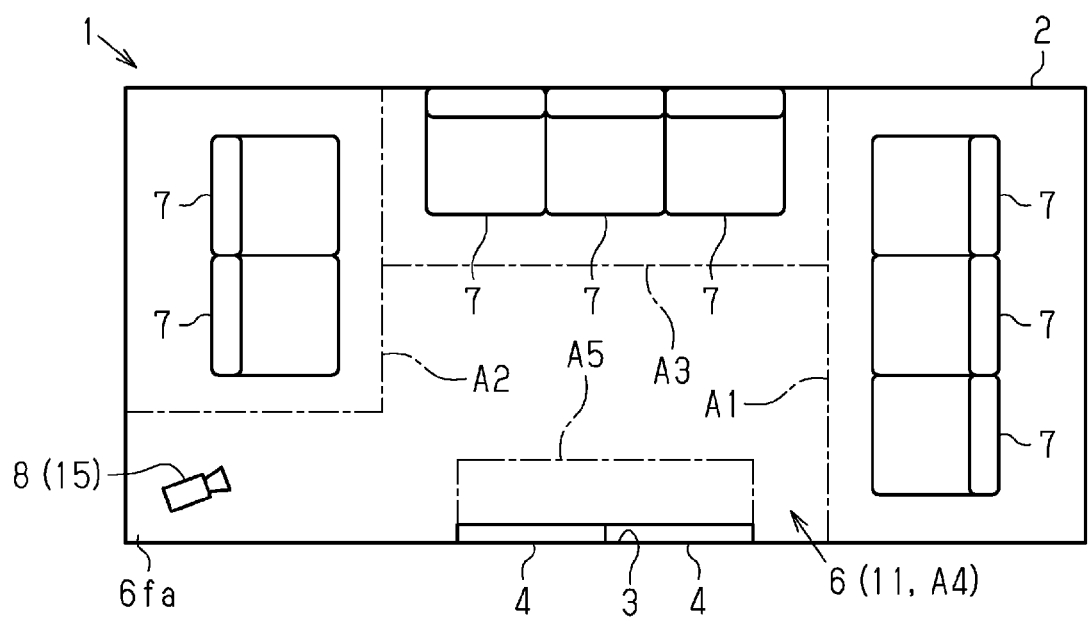
FIG. 3 is a diagram illustrating a case where the vehicle interior is viewed from above.

As shown in FIGS. 1 to 3, a vehicle 1 of the present embodiment includes a vehicle body 2 which extends in a front-rear direction of the vehicle and has a substantially rectangular box shape. A door opening portion 3, which serves as an entrance and exit for an occupant, is provided in a side surface of the vehicle body 2. The door opening portion 3 is provided with a pair of slide doors 4 and 4 that are opened and closed in the front-rear direction of the vehicle and in opposite directions. An occupant 5 in the vehicle 1 is on board the vehicle 1 in a "seating posture" in which the occupant 5 is seated on a seat 7 provided in a vehicle interior 6, or a "standing posture" in which a hanging strap or a handrail (not illustrated) is, for example, used.

Further, a camera 8 that captures an image of an inside of the vehicle interior 6 is provided in the vehicle 1 of the present embodiment. In the vehicle 1 of the present embodiment, the camera 8 is provided in the vicinity of a ceiling portion 9 near a corner portion 6fa at a front position of the vehicle interior 6. As the camera 8, for example, an infrared camera or the like is used. Thus, the camera 8 of the present embodiment is configured to capture an image of the occupant 5 in the vehicle 1 from a predetermined direction set in the vehicle interior 6.

Figure 4:
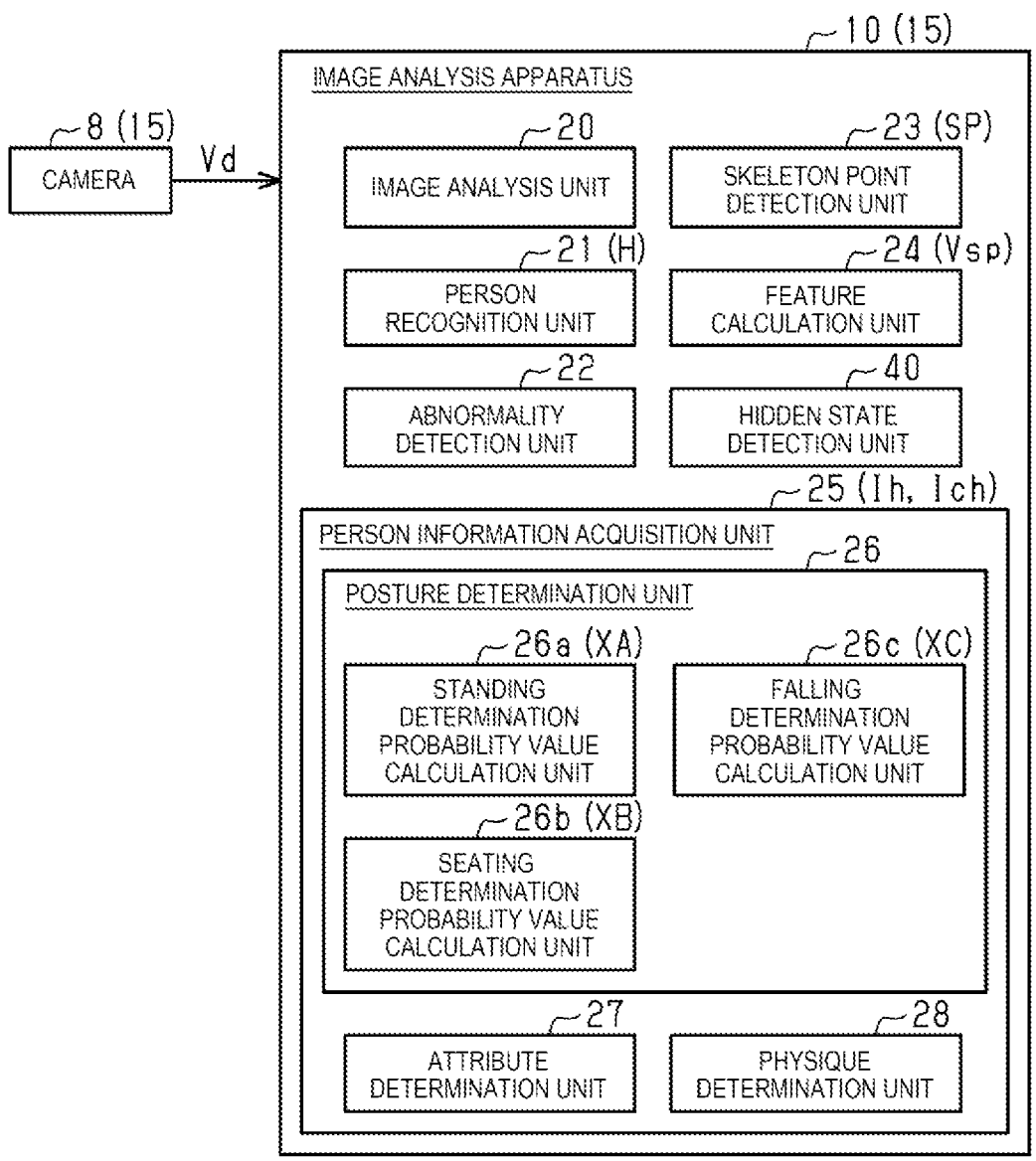
FIG. 4 is a block diagram showing a schematic configuration of an image analysis apparatus.

As shown in FIG. 4, in the vehicle 1 of the present embodiment, a captured image Vd of the inside of the vehicle interior 6 imaged by the camera 8 is input to an image analysis apparatus 10. Further, the image analysis apparatus 10 has a function of monitoring a state of the inside of the vehicle interior 6 imaged in the captured image Vd by analyzing the captured image Vd. Thus, in the vehicle 1 of the present embodiment, a monitoring system 15 is constructed in which the vehicle interior 6 imaged by the camera 8 is set as a monitored space 11.

In detail, the image analysis apparatus 10 of the present embodiment includes an image analysis unit 20, and a person recognition unit 21 that recognizes a person H in the vehicle interior 6 imaged in the captured image Vd, that is, the occupant 5 in the vehicle 1, based on a result of image analysis performed by the image analysis unit 20. In the image analysis apparatus 10 of the present embodiment, the person recognition unit 21 performs recognition processing for the person H by using an inference model generated by machine learning. Further, the image analysis apparatus 10 of the present embodiment includes an abnormality detection unit 22 that detects an abnormality occurring in the vehicle interior 6 imaged by the camera 8 by monitoring the occupant 5 in the vehicle 1 thus recognized.

Figure 5:
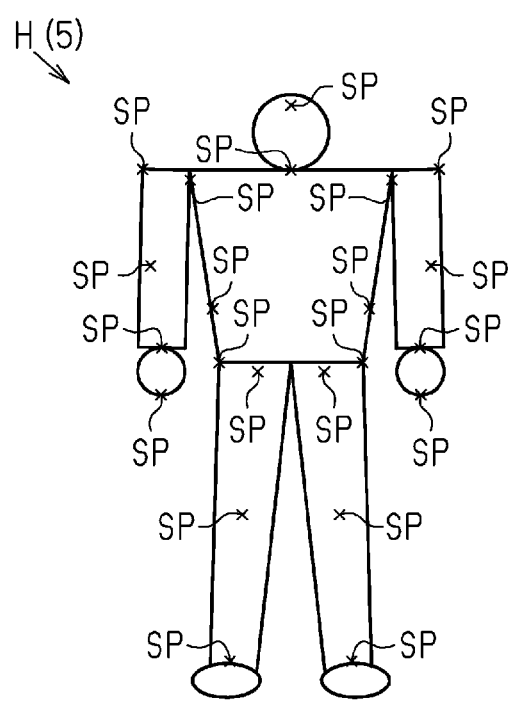
FIG. 5 is a diagram illustrating skeleton points of a person.

Specifically, as shown in FIGS. 4 and 5, the image analysis apparatus 10 of the present embodiment includes a skeleton point detection unit 23 that detects skeleton points SP of the person H included in the captured image Vd. That is, the skeleton points SP are unique points that characterize a body of the person H, such as joints and points on a body surface, and correspond to, for example, a head, a neck, shoulders, armpits, elbows, wrists, fingers, a waist, a hip joint, buttocks, knees, ankles, and the like. Further, in the image analysis apparatus 10 of the present embodiment, the skeleton point detection unit 23 also performs detection processing of the skeleton points SP by using an inference model generated by machine learning.

As shown in FIG. 4, the image analysis apparatus 10 of the present embodiment includes a feature calculation unit 24 that calculates a feature Vsp based on detection of the skeleton points SP. Specifically, in the image analysis apparatus 10 of the present embodiment, the feature calculation unit 24 calculates, based on positions of the skeleton points SP on two-dimensional coordinates in the captured image Vd, the feature Vsp of the person H imaged in the captured image Vd. Further, the feature calculation unit 24 calculates the feature Vsp of the person H imaged in the captured image Vd, for example, based on a body size indicated by the plurality of skeleton points SP, such as a shoulder width of the occupant 5. The image analysis apparatus 10 of the present embodiment includes a person information acquisition unit 25 that acquires, based on the feature Vsp of the person H obtained by a series of analysis processing, information Ih of the person H recognized in the monitored space 11 imaged by the camera 8.

In detail, the person information acquisition unit 25 of the present embodiment includes a posture determination unit 26 that determines a posture of the person H imaged in the captured image Vd. The posture determination unit 26 of the present embodiment inputs the feature Vsp of the person H acquired from the feature calculation unit 24 to an inference model generated by machine learning. Then, the posture determination unit 26 determines the posture of the person H imaged in the captured image Vd of the inside of the vehicle interior 6 based on a posture determination probability value thus obtained.

Specifically, the posture determination unit 26 of the present embodiment includes a standing determination probability value calculation unit 26a that calculates a probability that a posture of the occupant 5 as a posture determination target person is the "standing posture". In addition, the posture determination unit 26 includes a seating determination probability value calculation unit 26b that calculates a probability that the posture of the occupant 5 as the target person is the "seating posture". Further, the posture determination unit 26 of the present embodiment includes a falling determination probability value calculation unit 26c that calculates a probability that the posture of the occupant 5 as the target person is a "falling posture".

That is, in the posture determination unit 26 of the present embodiment, as the posture determination probability value, the standing determination probability value calculation unit 26a calculates a standing determination probability value XA, the seating determination probability value calculation unit 26b calculates a seating determination probability value XB, and the falling determination probability value calculation unit 26c calculates a falling determination probability value XC. Further, the posture determination unit 26 of the present embodiment performs calculation of the posture determination probability value such that a total value of the standing determination probability value XA, the seating determination probability value XB, and the falling determination probability value XC is "1.0". Thus, the posture determination unit 26 of the present embodiment can determine the posture of the occupant 5 without any contradiction based on the posture determination probability value.

The standing determination probability value XA calculated by the standing determination probability value calculation unit 26a of the present embodiment is further divided into a probability that the occupant 5 in the "standing posture" is in a "moving state", a probability that the occupant 5 is in a "still state", and a probability that the occupant 5 is in a "state in which the hanging strap, the handrail, or the like is used". Thus, the posture determination unit 26 of the present embodiment can subdivide and determine the "standing posture".

In the image analysis apparatus 10 of the present embodiment, when the posture determination unit 26 determines that the occupant 5 in the vehicle 1 falls down, the abnormality detection unit 22 determines that the abnormality occurs in the vehicle interior 6 imaged in the captured image Vd by the camera 8. Thus, the monitoring system 15 of the present embodiment can ensure safety in the vehicle interior 6.

In the image analysis apparatus 10 of the present embodiment, the person information acquisition unit 25 is provided with an attribute determination unit 27 that determines an attribute of the person H imaged in the captured image Vd, a physique determination unit 28 that determines a physique of the person H, and the like, in addition to the posture determination unit 26. Thus, the image analysis apparatus 10 of the present embodiment can detect, with high accuracy, a state of the person H imaged in the captured image Vd.

Figure 6:
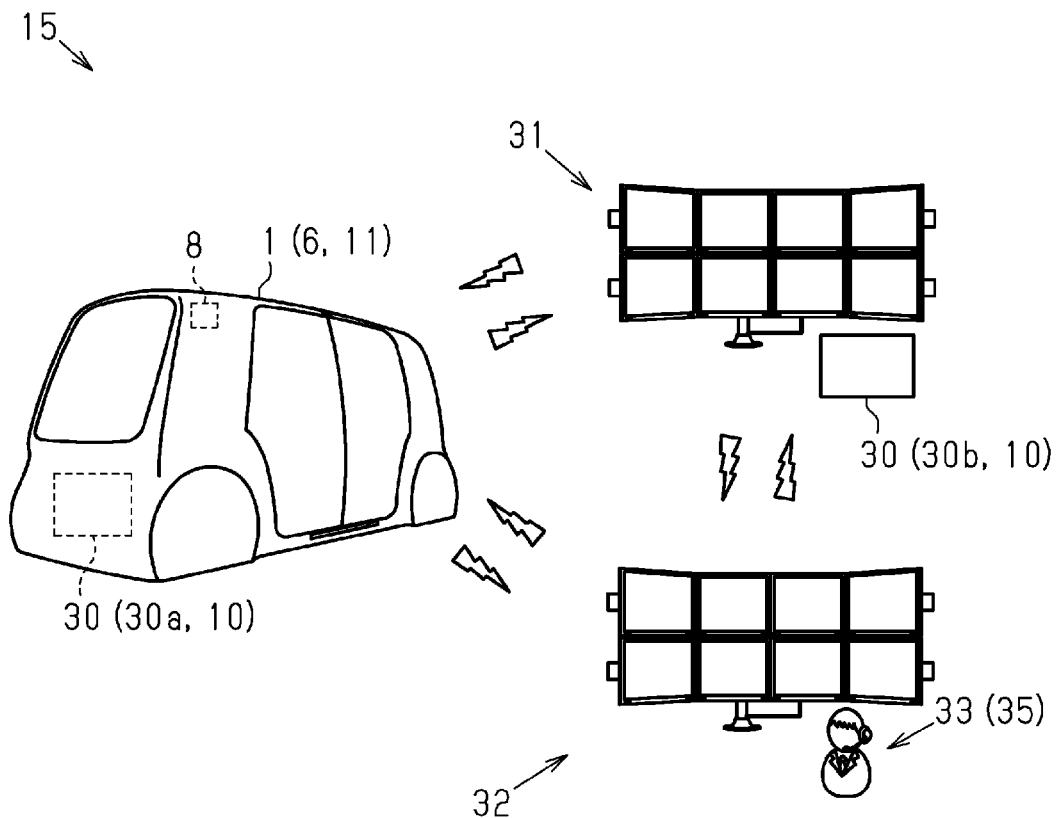
FIG. 6 is a schematic configuration diagram of the monitoring system.

As shown in FIG. 6, the monitoring system 15 of the present embodiment is formed by connecting a plurality of information processing apparatuses 30, which are disposed inside and outside the vehicle 1, with one another via an information communication network (not illustrated). Specifically, the image analysis apparatus 10 of the present embodiment is configured such that an in-vehicle information processing apparatus 30a mounted in the vehicle 1, and an information processing apparatus 30b which is outside the vehicle and constitutes a cloud server 31 perform image analysis processing in a distributed manner. Thus, the monitoring system 15 of the present embodiment is configured to ensure excellent mountability in the vehicle 1 by reducing a calculation load of the information processing apparatus 30a mounted in the vehicle 1.

Further, the monitoring system 15 of the present embodiment is configured such that when the abnormality occurs, an administrator 35 outside the vehicle, such as an operator 33 stationed in an operation center 32 of the vehicle 1, can confirm the captured image Vd of the inside of the vehicle interior 6 imaged by the camera 8. Thus, in the monitoring system 15 of the present embodiment, high reliability and safety are ensured.

(Hidden State Detection)

Next, a hidden state detection function implemented in the image analysis apparatus 10 of the present embodiment will be described.

As shown in FIG. 4, the image analysis apparatus 10 of the present embodiment includes a hidden state detection unit 40 that detects occurrence of a so-called hidden state in which acquisition of the information Ih based on the image analysis may be hindered since a plurality of persons H are imaged to overlap in the captured image Vd. That is, when a plurality of occupants 5 are on board the vehicle 1, the occupant 5 at a position away from the camera 8 may be hidden by the occupant 5 at a position closer to the camera 8 in the captured image Vd of the vehicle interior 6 imaged by the camera 8. As a result, there arises a problem that for the back occupant 5 hidden by the front occupant 5, a presence thereof cannot be recognized or the detection of the skeleton points SP is incomplete, so that occupant information Ich cannot be acquired with high accuracy.

In view of the above description, in the image analysis apparatus 10 of the present embodiment, the occurrence of such a hidden state is detected by the hidden state detection unit 40. Thus, the monitoring system 15 of the present embodiment is configured such that a state in which the occupant 5 in the vehicle interior 6 is not correctly imaged in the captured image Vd can be grasped.

Figure 7:
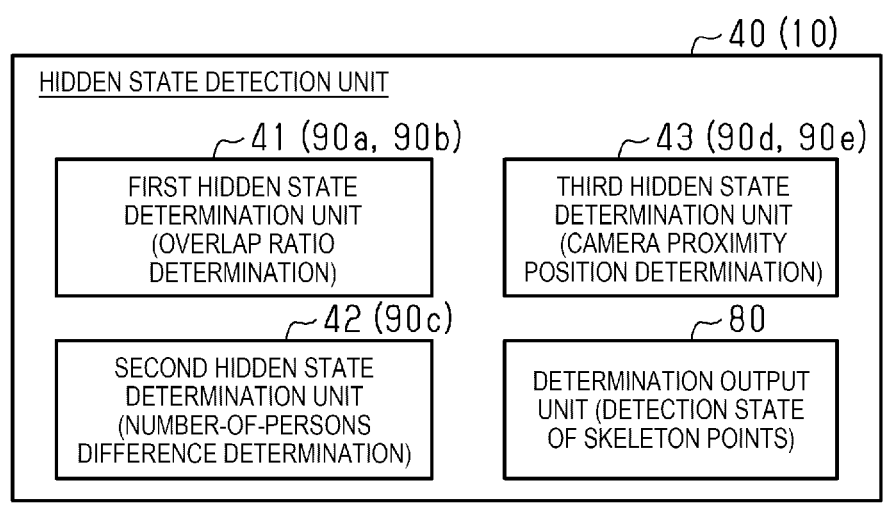
FIG. 7 is a block diagram showing a schematic configuration of a hidden state detection unit.

Specifically, as shown in FIG. 7, the hidden state detection unit 40 of the present embodiment includes a first hidden state determination unit 41, a second hidden state determination unit 42, and a third hidden state determination unit 43. The first hidden state determination unit 41, the second hidden state determination unit 42, and the third hidden state determination unit 43 are configured to perform, by different methods, determination of the hidden state occurring in the captured image Vd by the camera 8, respectively.

(Overlap Ratio Determination)

First, detection and determination of the hidden state based on overlap ratio determination performed by the first hidden state determination unit 41 will be described.

Figure 8:
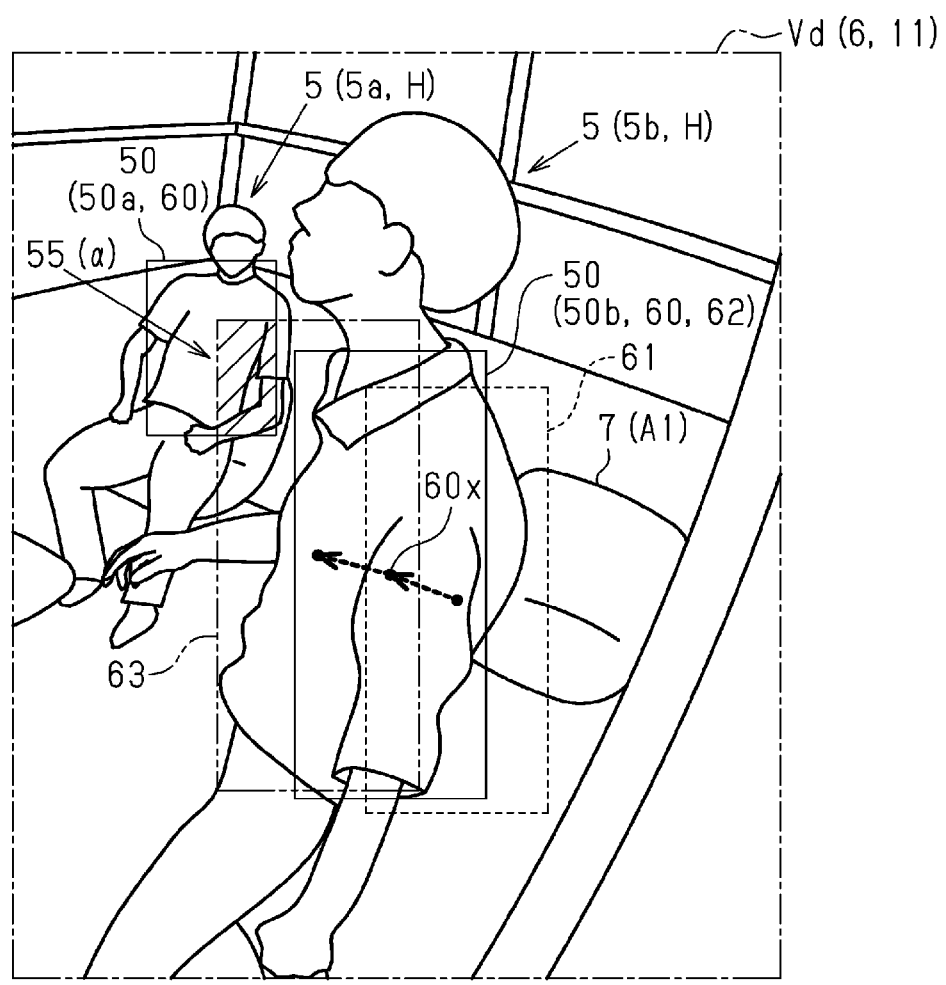
FIG. 8 is a diagram illustrating movement prediction for the occupant and overlap ratio calculation.

As shown in FIG. 8, in the hidden state detection unit 40 of the present embodiment, the first hidden state determination unit 41 performs movement prediction for the person H imaged in the captured image Vd by the camera 8. Further, the first hidden state determination unit 41 determines, based on the movement prediction, whether there is an imaged area 50 of the person H estimated to be "imaged to overlap" after a predetermined future time. As the "predetermined future time", for example, a scheduled timing or the like at which next image analysis is performed is set. Further, the first hidden state determination unit 41 calculates an overlap ratio $\alpha$ of the imaged area 50 for such the imaged area 50 of the person H which is imaged to overlap. The first hidden state determination unit 41 of the present embodiment performs the detection and determination of the hidden state occurring in the captured image Vd based on a comparison between the overlap ratio $\alpha$ and a predetermined overlap determination value $\alpha th$.

In detail, in the image analysis apparatus 10 of the present embodiment, an imaged area 60 of an upper body of the occupant 5 imaged in the captured image Vd, specifically, a torso portion thereof is used as the imaged area 50 of the person H in the calculation of the overlap ratio $\alpha$ performed by the first hidden state determination unit 41. Specifically, the first hidden state determination unit 41 of the present embodiment calculates a movement direction and a movement amount of a center point $60x$ for imaged areas 61 and 62 of the torso portion detected in the captured image Vd at previous and current analysis timings. Further, the first hidden state determination unit 41 compares sizes of these imaged areas 61 and 62. Thus, the first hidden state determination unit 41 of the present embodiment is configured to predict, at the predetermined future time, a position and a size of an imaged area 63 imaged in the captured image Vd.

For example, FIG. 8 illustrates a situation in which an occupant $5b$ in the standing posture walks across a position on a front side closer to the camera 8 than an occupant $5a$ in a seated posture who is seated on the seat 7 in a rear seat area A1. In this case, for the occupant $5a$ in the seated posture, an imaged area $50a$ in the captured image Vd does not substantially move. On the other hand, for the occupant $5b$ in the standing posture, it is predicted that an imaged area $50b$ moves from the lower right to the upper left in the captured image Vd in FIG. 8 as the occupant $5b$ walks. Further, an overlap area 55 in which the imaged areas $50a$ and $50b$ of the occupants $5a$ and $5b$ are imaged to overlap in the captured image Vd is estimated based on the movement prediction. Thus, the first hidden state determination unit 41 of the present embodiment is configured to calculate, as the overlap ratio $\alpha$, a proportion of the overlap area 55 to the imaged area $50a$ of the occupant $5a$ at a far position who is predicted to be hidden by the occupant $5b$ in the standing posture close to the camera 8.

Figure 9:
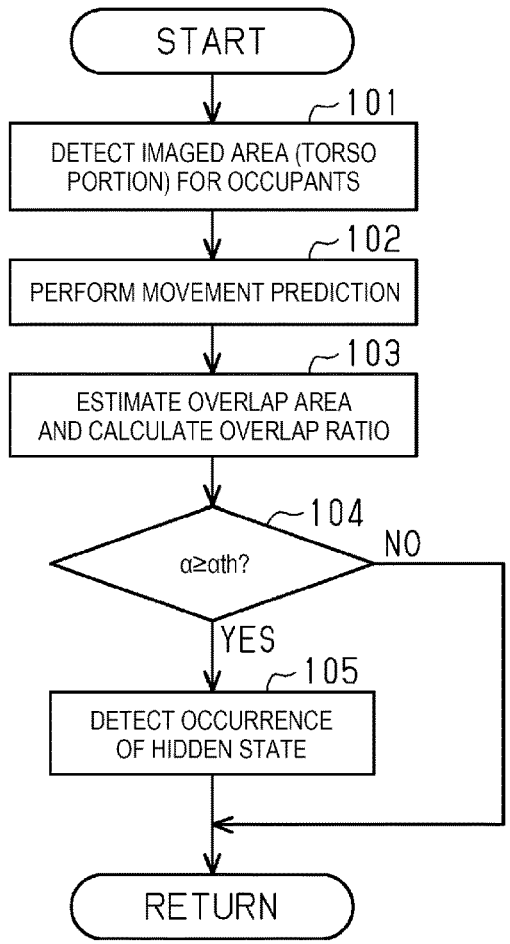
FIG. 9 is a flowchart showing a processing procedure of hidden state detection based on overlap ratio determination.

That is, as shown in FIG. 9, the first hidden state determination unit 41 of the present embodiment detects the imaged area 50 for each of the occupants 5 imaged in the captured image Vd (step 101). Next, the first hidden state determination unit 41 performs the movement prediction for each of the occupants 5 (step 102). Subsequently, the first hidden state determination unit 41 estimates the overlap area 55 formed in the imaged area 50 of each occupant 5 based on the movement prediction, and calculates the overlap ratio $\alpha$ (step 103). Then, when the overlap ratio $\alpha$ is equal to or greater than the predetermined overlap determination value $\alpha th$ ($\alpha \geq \alpha th$, YES in step 104), the first hidden state determination unit 41 of the present embodiment determines that the hidden state occurs in the captured image Vd (step 105).

(Number-of-Persons Difference Determination)

Next, detection and determination of the hidden state based on number-of-persons difference determination performed by the second hidden state determination unit 42 will be described.

Figure 10:
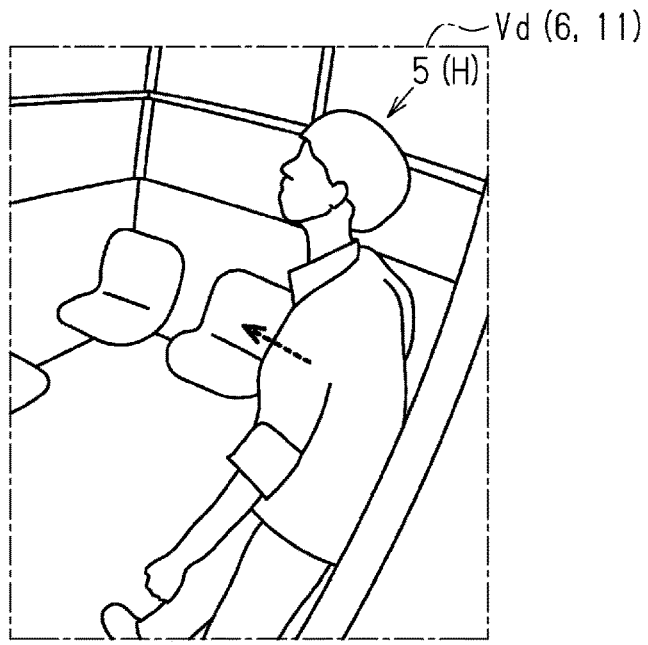
FIG. 10 is a diagram illustrating boarding detection.
Figure 11:
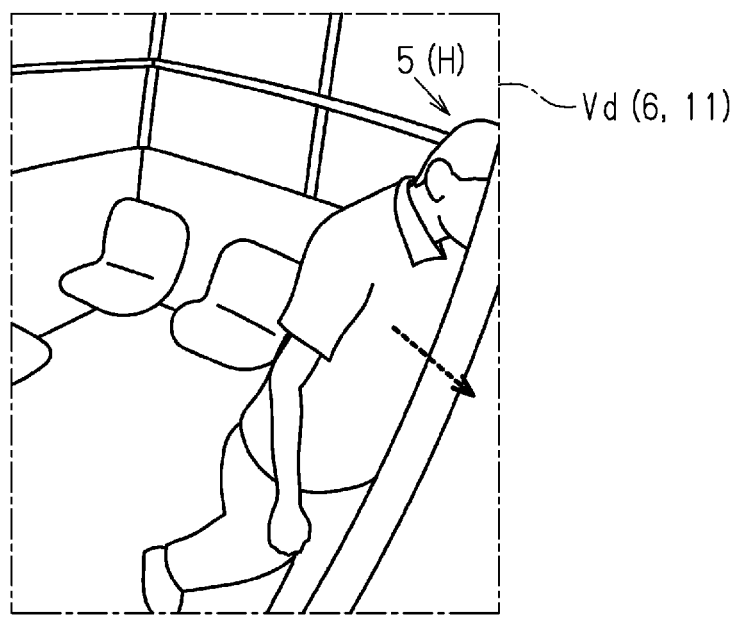
FIG. 11 is a diagram illustrating alighting detection.

As shown in FIGS. 10 and 11, in the hidden state detection unit 40 of the present embodiment, the second hidden state determination unit 42 measures, based on analysis of the captured image Vd, the number of entering and exiting persons H entering and exiting the vehicle interior 6 that is the monitored space 11 imaged in the captured image Vd, that is, the number of boarding and alighting occupants of the vehicle 1. The second hidden state determination unit 42 of the present embodiment is configured to specify the total number of persons in the vehicle interior 6 based on the measurement of the number of boarding and alighting occupants.

In detail, as shown in FIGS. 1 and 3, in the monitoring system 15 of the present embodiment, the rear seat area A1, a front seat area A2, and an intermediate seat area A3, which are disposed in a substantially U-shape, are set in the vehicle interior 6 of the vehicle 1 imaged by the camera 8. In the vehicle interior 6 of the vehicle 1, a floor area A4 in which the occupant 5 can be on board in the standing posture is set in a range surrounded by the rear seat area A1, the front seat area A2, and the intermediate seat area A3. Further, in the vehicle interior 6 of the vehicle 1, a boarding and alighting area A5 where the occupant 5 is prohibited to stay is set in the vicinity of the slide doors 4 and 4 that open and close the door opening portion 3. When the occupant 5 is detected in the boarding and alighting area A5, the second hidden state determination unit 42 of the present embodiment determines that the occupant 5 is an occupant 5 on board the vehicle 1 or an occupant 5 alighting from the vehicle 1.

Specifically, as shown in FIGS. 10 and 11, the second hidden state determination unit 42 of the present embodiment specifies a movement direction of the occupant 5 located in the boarding and alighting area A5. Further, when the movement direction of the occupant 5 is a direction from the door opening portion 3 toward the inside of the vehicle interior 6 (see FIG. 10, leftward in FIG. 10), the second hidden state determination unit 42 determines that the occupant 5 is on board the vehicle 1. When the movement direction of the occupant 5 is a direction from the inside of the vehicle interior 6 toward the door opening portion 3 (see FIG. 11, rightward in FIG. 11), the second hidden state determination unit 42 determines that the occupant 5 is to alight from the vehicle 1.

In the image analysis apparatus 10 of the present embodiment, boarding and alighting determination for the occupant 5 performed by the second hidden state determination unit 42 is performed in a state in which the captured image Vd of the vehicle interior 6 imaged by the camera 8 is converted into a top view as shown in FIG. 3. Thus, the second hidden state determination unit 42 of the present embodiment can measure the number N of boarding and alighting occupants of the vehicle 1 with high accuracy.

Further, the second hidden state determination unit 42 of the present embodiment measures the number of boarding and alighting occupants of the vehicle 1 by adopting "+1" when one occupant 5 on board the vehicle 1 is detected, and adopting "−1" when one occupant 5 alighting from the vehicle 1 is detected. Thus, the second hidden state determination unit 42 of the present embodiment can specify the total number of occupants 5 located in the vehicle interior 6 based on the measurement of the number of boarding and alighting occupants.

Figure 12:
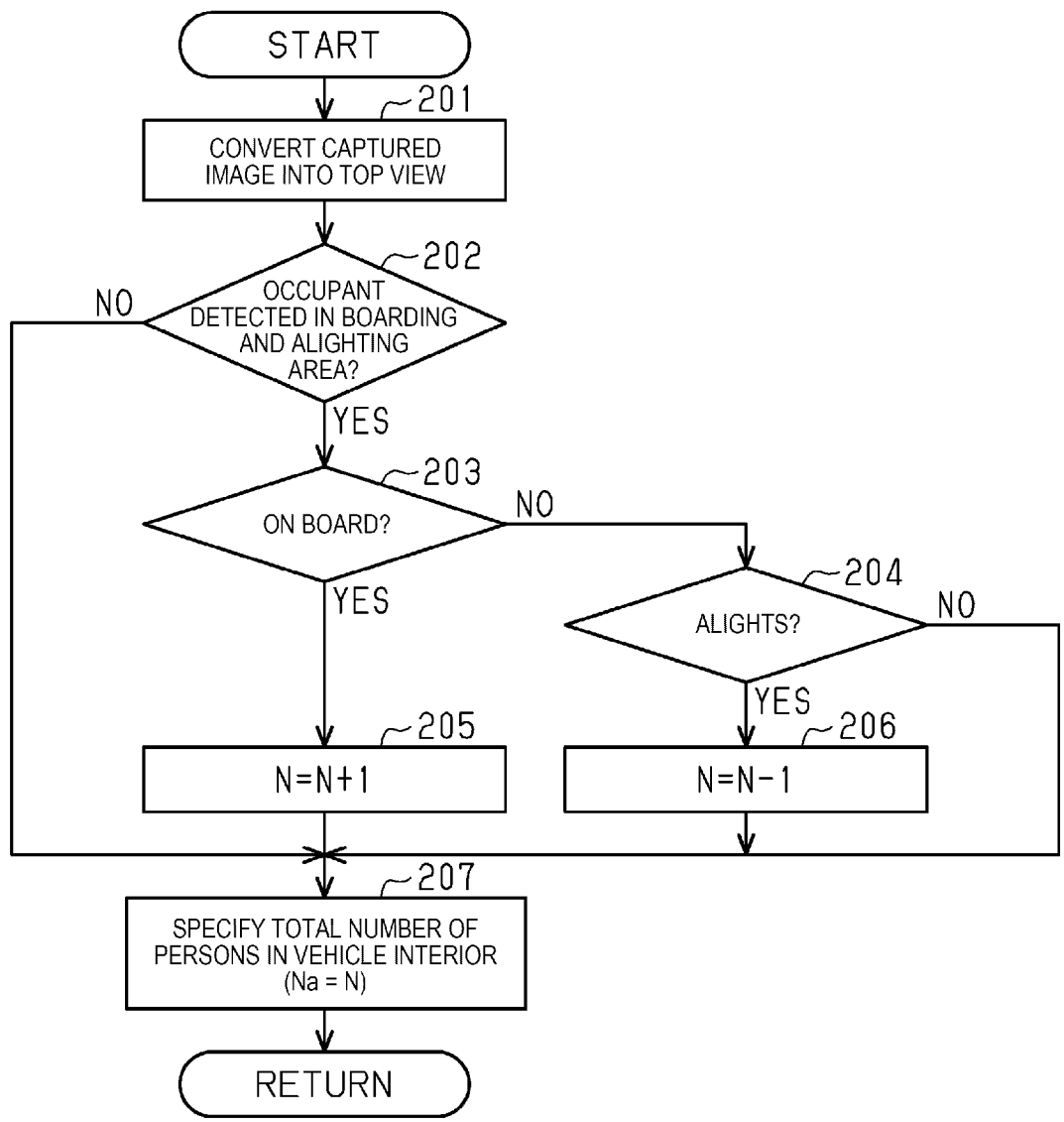
FIG. 12 is a flowchart showing a processing procedure of measurement of the number of boarding and alighting occupants.

That is, as shown in FIG. 12, the second hidden state determination unit 42 of the present embodiment converts the captured image Vd of the vehicle interior 6 imaged by the camera 8 into the top view (step 201), and determines whether the occupant 5 is detected in the boarding and alighting area A5 before the door opening portion 3 (step 202). Next, when the occupant 5 is detected in the boarding and alighting area A5 (YES in step 202), the second hidden state determination unit 42 determines whether the occupant 5 is on board the vehicle 1 or alights from the vehicle 1 (step 203 and step 204). Further, when the occupant 5 on board the vehicle 1 is detected (YES in step 203), the second hidden state determination unit 42 adds "1" to the number N of boarding and alighting occupants of the vehicle 1 to be measured (N=N+1, step 205). When the occupant 5 alighting from the vehicle 1 is detected (YES in step 204), the second hidden state determination unit 42 subtract "1" from the number N of boarding and alighting occupants of the vehicle 1 to be measured (N=N−1, step 206). Then, the second hidden state determination unit 42 of the present embodiment specifies the number N of boarding and alighting occupants thus accumulated as the total number Na of occupants 5 located in the vehicle interior 6 (Na=N, step 207).

The second hidden state determination unit 42 of the present embodiment calculates the detected number Nd of occupants 5 imaged in the captured image Vd as the detected number of persons H imaged in the captured image Vd of the vehicle interior 6 based on the detection of the skeleton points SP as described above. Specifically, when the occupant 5 whose main skeleton points SP used for the above posture determination or the like can be extracted is detected in the captured image Vd of the vehicle interior 6 imaged by the camera 8, the second hidden state determination unit 42 of the present embodiment adds the occupant 5 to the detected number Nd of persons in the captured image Vd. Further, the second hidden state determination unit 42 compares the total number Na of persons in the vehicle interior 6 specified by the measurement of the number N of boarding and alighting occupants as described above with the detected number Nd of occupants 5 imaged in the captured image Vd. The second hidden state determination unit 42 of the present embodiment is configured to perform the detection and determination of the hidden state occurring in the captured image Vd based on a difference between the total number Na of persons and the detected number Nd of persons.

Figure 13:
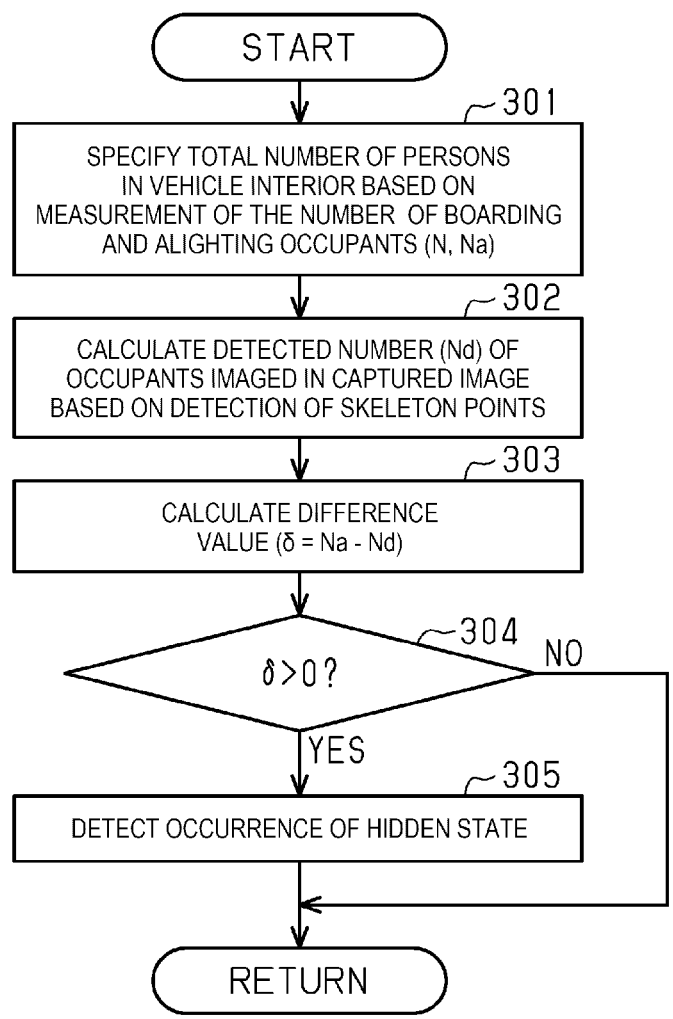
FIG. 13 is a flowchart showing a processing procedure of hidden state detection based on number-of-persons difference determination.

In more detail, as shown in FIG. 13, when the second hidden state determination unit 42 of the present embodiment specifies the total number Na of persons in the vehicle interior 6 based on the measurement of the number N of boarding and alighting occupants (step 301), the second hidden state determination unit 42 subsequently calculates the detected number Nd of occupants 5 imaged in the captured image Vd (step 302). Next, the second hidden state determination unit 42 calculates a difference value δ (δ=Na−Nd, step 303) between the total number Na of persons in the vehicle interior 6 specified based on the measurement of the number N of boarding and alighting occupants and the detected number Nd of occupants 5 imaged in the captured image Vd. Then, when the difference value δ is a value larger than "0" (δ>0, YES in step 304), the second hidden state determination unit 42 of the present embodiment determines that the hidden state occurs in the captured image Vd (step 305).

(Camera Proximity Position Determination)

Next, detection and determination of the hidden state based on camera proximity position determination performed by the third hidden state determination unit 43 will be described.

Figure 14:
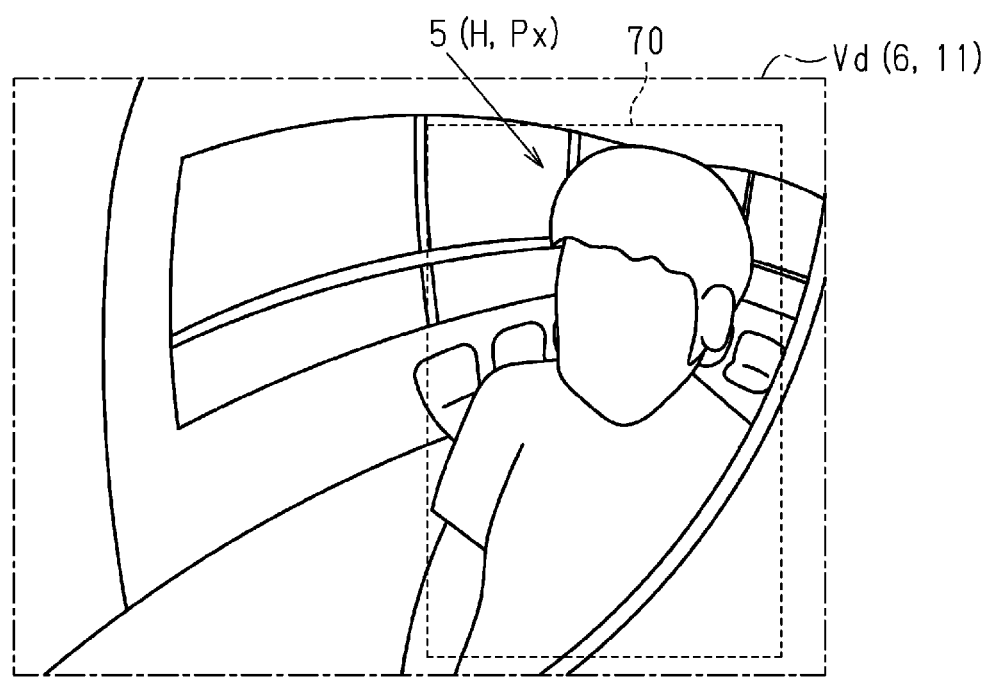
FIG. 14 is a diagram illustrating the occupant imaged in a captured image at a hiding position in proximity to the camera.

As shown in FIG. 14, when the occupant 5 in the vehicle interior 6 stands at a position in proximity to the camera 8, the occupant 5 may block a field of view of the camera 8. Thus, the hidden state may occur in the captured image Vd in such a manner that the occupant 5 at the position in proximity to the camera 8 hides another occupant 5 located in the vehicle interior 6.

In view of the above description, in the hidden state detection unit 40 of the present embodiment, the third hidden state determination unit 43 performs, at such a hiding position Px in proximity to the camera 8, detection and determination of the occupant 5 imaged in the captured image Vd. When the occupant 5 imaged in the captured image Vd is detected at the hiding position Px, the third hidden state determination unit 43 of the present embodiment regards that the hidden state occurs in the captured image Vd.

Figure 15:
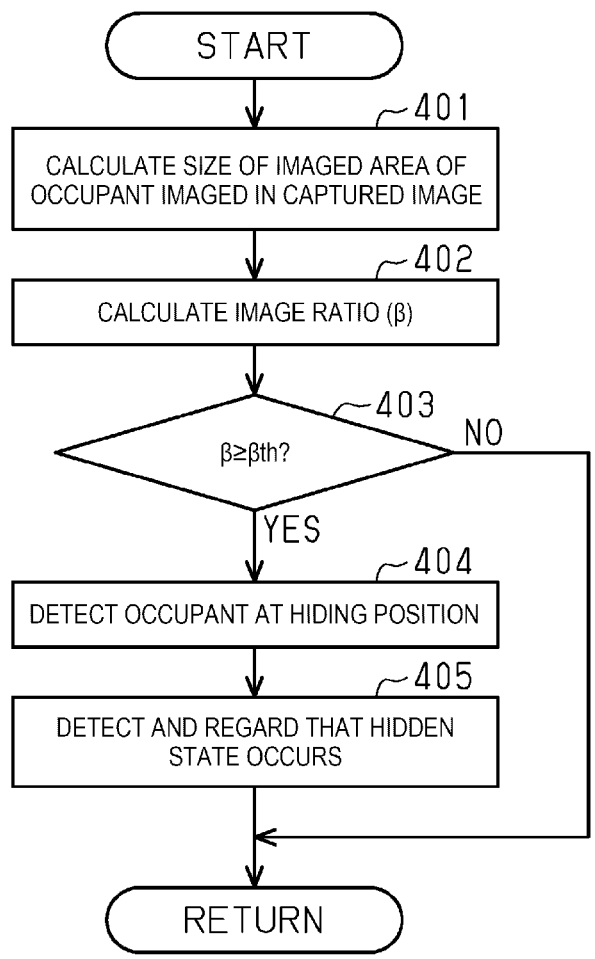
FIG. 15 is a flowchart showing a processing procedure of hidden state detection based on camera proximity position determination.

Specifically, as shown in FIGS. 14 and 15, the third hidden state determination unit 43 of the present embodiment calculates a size of an imaged area 70 of the occupant 5 imaged in the captured image Vd (step 401). Next, the third hidden state determination unit 43 calculates, as an image ratio β, a proportion of the imaged area 70 of the occupant 5 to the entire captured image Vd (step 402). Subsequently, the third hidden state determination unit 43 compares the image ratio β with a predetermined proximity determination value βth (step 403). In the third hidden state determination unit 43 of the present embodiment, processing in steps 401 to 403 is performed for all the occupants 5 imaged in the captured image Vd. Further, when the occupant 5 having the image ratio β equal to or greater than the proximity determination value βth is detected (β≥βth, YES in step 403), the third hidden state determination unit 43 determines that the occupant 5 is imaged in the captured image Vd at the hiding position Px in proximity to the camera 8 (step 404). Thus, the third hidden state determination unit 43 of the present embodiment regards that the hidden state occurs in the captured image Vd (step 405).

(Determination Output for Detection State of Skeleton Points)

Next, determination output for a detection state of the skeleton points SP in the captured image Vd in which the occurrence of the hidden state is detected will be described.

The monitoring system 15 of the present embodiment is configured such that even when the occurrence of the hidden state is detected as described above, the administrator 35 outside the vehicle, such as the operator 33 stationed in the operation center 32 of the vehicle 1, can confirm the captured image Vd of the vehicle interior 6 imaged by the camera 8. At this time, in the monitoring system 15 of the present embodiment, detection output of the hidden state from the hidden state detection unit 40 is distributed to the operation center 32 in which the operator 33 is stationed, together with the captured image Vd of the vehicle interior 6.

In detail, as shown in FIG. 7, the hidden state detection unit 40 of the present embodiment includes a determination output unit 80 that performs, as the detection output, the determination output for the detection state of the skeleton points SP in the captured image Vd in which the occurrence of the hidden state is detected, when the occurrence of the hidden state is detected.

Specifically, when the hidden state occurring in the captured image Vd is detected based on the overlap ratio determination performed by the first hidden state determination unit 41, as the detection output, the determination output unit 80 of the present embodiment outputs the detection state of the skeleton points SP using the captured image Vd as being "indeterminate". When the hidden state occurring in the captured image Vd is detected based on the number-of-persons difference determination performed by the second hidden state determination unit 42, as the detection output, the determination output unit 80 outputs the detection state of the skeleton points SP using the captured image Vd as being "indeterminate". When it is regarded that the hidden state occurs in the captured image Vd based on the camera proximity position determination performed by the third hidden state determination unit 43, as the detection output, the determination output unit 80 of the present embodiment outputs the detection state of the skeleton points SP using the captured image Vd as being "undeterminable".

That is, output of "indeterminate" from the hidden state detection unit 40 indicates a state in which accuracy for acquisition of the occupant information Ich based on the detection of the skeleton points SP decreases due to the presence of an undetected occupant 5 whose skeleton points SP cannot be detected. Output of "undeterminable" from the hidden state detection unit 40 indicates a state in which it is not possible to determine whether the skeleton points SP are undetected even by the overlap ratio determination performed by the first hidden state determination unit 41 and the number-of-persons difference determination performed by the second hidden state determination unit 42. Further, in the monitoring system 15 of the present embodiment, the output of "undeterminable" is handled as "occurrence of the abnormality" with high emergency, as in a case of detection output of the abnormality from the abnormality detection unit 22. Thus, the monitoring system 15 of the present embodiment is configured such that the administrator 35 outside the vehicle can confirm the captured image Vd of the vehicle interior 6 while referring to the detection state of the skeleton points SP, that is, accuracy of the occupant information Ich acquired by the image analysis.

Figure 16:
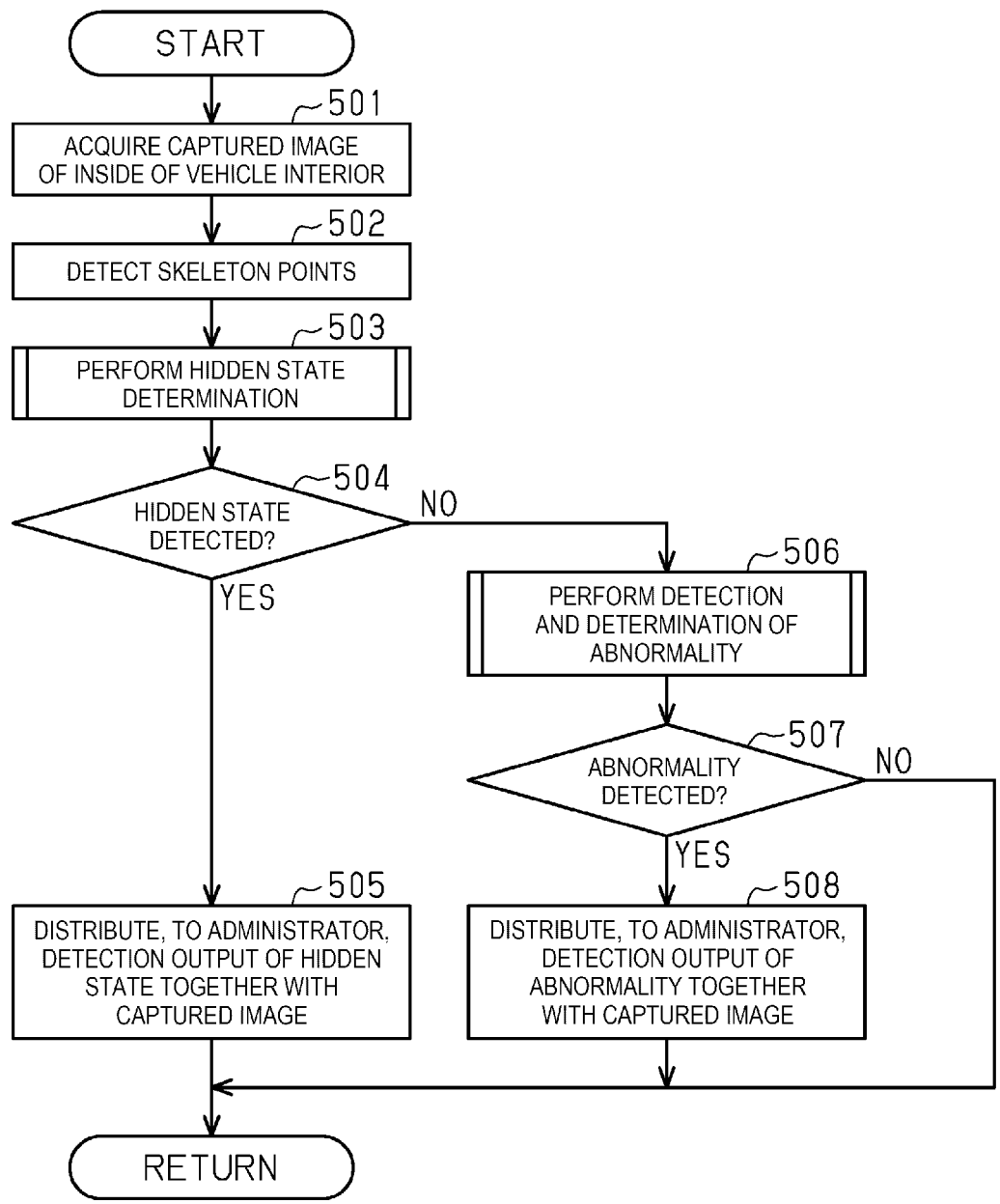
FIG. 16 is a flowchart showing a processing procedure of hidden state detection and abnormality detection.

In detail, as shown in FIG. 16, when the image analysis apparatus 10 of the present embodiment acquires the captured image Vd of the inside of the vehicle interior 6 (step 501), the image analysis apparatus 10 performs the image analysis to detect the skeleton points SP of the occupant 5 imaged in the captured image Vd (step 502). Next, the hidden state detection unit 40 of the image analysis apparatus 10 performs hidden state determination (step 503). Then, when the hidden state in the captured image Vd is detected by the hidden state determination (YES in step 504), the image analysis apparatus 10 performs detection output control of distributing, to the administrator 35 outside the vehicle, the detection output of the hidden state together with the captured image Vd (step 505).

Figure 17:
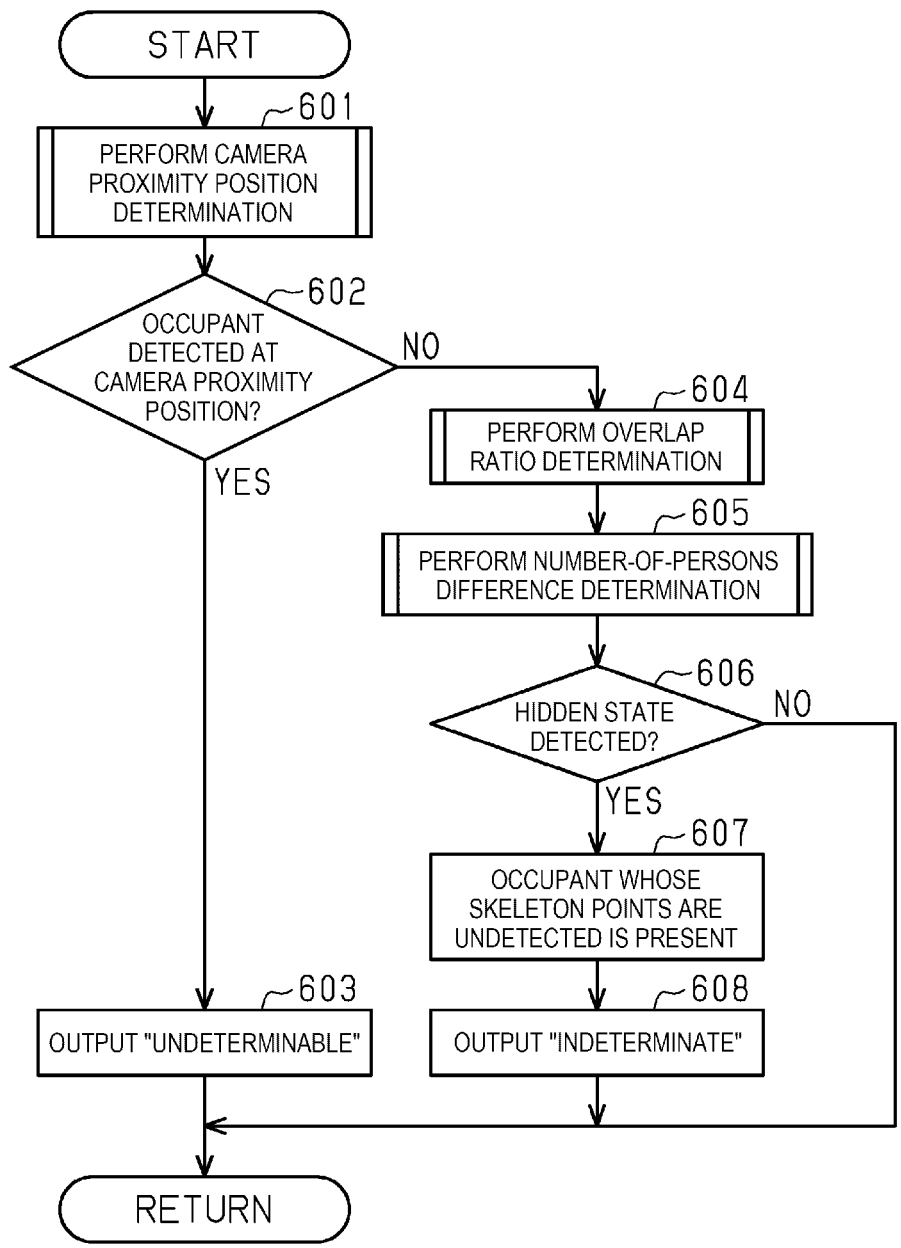
FIG. 17 is a flowchart showing a processing procedure of determination output for a detection state of the skeleton points.

Specifically, as shown in FIG. 17, in the image analysis apparatus 10 of the present embodiment, first, the third hidden state determination unit 43 of the hidden state detection unit 40 performs the detection and determination of the hidden state, that is, the camera proximity position determination (step 601). Then, when the occupant 5 imaged in the captured image Vd is detected at the hiding position Px in proximity to the camera 8 (YES in step 602), the determination output unit 80 of the hidden state detection unit 40 of the present embodiment outputs "undeterminable" (step 603).

When the occupant 5 is not detected at the hiding position Px in proximity to the camera 8 (NO in step 602), the first hidden state determination unit 41 of the hidden state detection unit 40 performs the detection and determination of the hidden state, that is, the overlap ratio determination (step 604). Subsequently, the second hidden state determination unit 42 of the hidden state detection unit 40 performs the detection and determination of the hidden state, that is, the number-of-persons difference determination (step 605). Further, when the hidden state in the captured image Vd is detected by the overlap ratio determination and the number-of-persons difference determination (YES in step 606), the hidden state detection unit 40 determines that the occupant 5 whose skeleton points SP are undetected is present in the vehicle interior 6 (step 607). Thus, the image analysis apparatus 10 of the present embodiment is configured such that the determination output unit 80 of the hidden state detection unit 40 outputs "indeterminate" as the detection output of the hidden state (step 608).

As shown in FIG. 16, when the hidden state in the captured image Vd is not detected in the hidden state determination (NO in step 504), the abnormality detection unit 22 of the image analysis apparatus 10 performs detection and determination of the abnormality in the vehicle interior 6 imaged in the captured image Vd (step 506). That is, as described above, in the image analysis apparatus 10 of the present embodiment, the detection and determination of the abnormality performed by the abnormality detection unit 22 is based on the posture determination for the occupant 5 performed by the posture determination unit 26 based on the detection of the skeleton points SP, specifically, detection of the falling posture. The image analysis apparatus 10 of the present embodiment is configured such that when the abnormality in the vehicle interior 6 is detected by the abnormality detection unit 22 (YES in step 507), the abnormality detection unit 22 distributes, to the administrator 35 outside the vehicle, the detection output of the abnormality together with the captured image Vd (step 508).

Next, actions of the present embodiment will be described.

That is, in the image analysis apparatus 10 of the present embodiment, the overlap ratio α of the imaged area 50 estimated based on the movement prediction is calculated for each of the occupants 5 imaged in the captured image Vd of the vehicle interior 6. The difference value δ between the total number Na of persons in the vehicle interior 6 specified by the measurement of the number N of boarding and alighting occupants and the detected number Nd of the occupants 5 imaged in the captured image Vd is calculated. Further, the detection and determination as to whether the occupant 5 imaged in the captured image Vd is present at the hiding position Px in proximity to the camera 8 is performed. The occurrence of the hidden state in which the plurality of occupants 5 are imaged to overlap in the captured image Vd is detected based on results of the overlap ratio determination, the number-of-persons difference determination, and the camera proximity position determination.

Next, effects of the present embodiment will be described.

(1) The image analysis apparatus 10 includes the person information acquisition unit 25 that acquires the information Ih of the person H imaged in the captured image Vd, that is, the occupant information Ich of the occupant 5 by setting the vehicle interior 6 of the vehicle 1 imaged by the camera 8 as the monitored space 11 and analyzing the captured image Vd. Further, the image analysis apparatus 10 includes the hidden state detection unit 40 that detects the occurrence of the hidden state in which the plurality of occupants 5 are imaged to overlap in the captured image Vd.

According to the above configuration, it is possible to detect the hidden state occurring in the captured image Vd and grasp the state in which the occupant 5 in the vehicle interior 6 is not correctly imaged in the captured image Vd. In this case, for example, information acquisition with high accuracy can be ensured by avoiding analytical use of the captured image Vd in which the hidden state occurs.

(2) The first hidden state determination unit 41 provided in the hidden state detection unit 40 has a function as a movement prediction unit 90a that performs the movement prediction for each of the occupants 5 imaged in the captured image Vd. In addition, the first hidden state determination unit 41 has a function as an overlap ratio calculation unit 90b that calculates the overlap ratio α for the imaged area 50 of each of the occupants 5, and the imaged area 50 is estimated to be imaged to overlap in the captured image Vd based on the movement prediction. The first hidden state determination unit 41 performs the detection and determination of the hidden state based on the comparison between the overlap ratio α and the overlap determination value αth.

According to the above configuration, the occurrence of the hidden state in the captured image Vd can be detected with high accuracy. Further, the image analysis apparatus 10 has an advantage that the occurrence of the hidden state can be predicted in advance. Thus, the information acquisition can be performed with higher accuracy.

(3) The second hidden state determination unit 42 provided in the hidden state detection unit 40 has a function as a number-of-entering-and-exiting-persons measurement unit 90c that measures the number N of boarding and alighting occupants 5 that is the number of entering and exiting persons H entering and exiting the monitored space 11. The second hidden state determination unit 42 performs the detection and determination of the hidden state based on the difference between the total number Na of persons in the vehicle interior 6 specified by the measurement of the number N of boarding and alighting occupants and the detected number Nd of occupants 5 imaged in the captured image Vd.

That is, when the hidden state does not occur in the captured image Vd, the detected number Nd of occupants 5 imaged in the captured image Vd is equal to the total number Na of persons in the vehicle interior 6. Therefore, according to the above configuration, the hidden state occurring in the captured image Vd can be easily detected with a simple configuration.

(4) The third hidden state determination unit 43 provided in the hidden state detection unit 40 regards that the hidden state occurs in the captured image Vd when the occupant 5 imaged in the captured image Vd is detected at the hiding position Px in proximity to the camera 8.

That is, the hidden state may occur in the captured image Vd in such a manner that the occupant 5 imaged in the captured image Vd at the hiding position Px in proximity to the camera 8 blocks the field of view of the camera 8 to hide another occupant 5 located in the vehicle interior 6. In this case, it is not possible to determine whether the hidden state actually occurs. In view of the above description, as in the above configuration, it is regarded that the hidden state occurs. In this case, for example, the information acquisition with high accuracy can be ensured by avoiding analytical use of the captured image Vd in which the hidden state occurs.

(5) The third hidden state determination unit 43 has a function as an image ratio calculation unit 90d that calculates, as the image ratio β, the proportion of the imaged area 70 of the occupant 5 imaged in the captured image Vd to the entire captured image Vd. The third hidden state determination unit 43 has a function as a camera proximity position determination unit 90e that determines that the occupant 5 is imaged in the captured image Vd at the hiding position Px when the occupant 5 having the image ratio β equal to or greater than the predetermined proximity determination value βth is detected. Thus, the occupant 5 imaged in the captured image Vd at the hiding position Px in proximity to the camera 8 can be detected with a simple configuration.

(6) The image analysis apparatus 10 includes the skeleton point detection unit 23 that detects the skeleton points SP of the occupant 5 included in the captured image Vd. The image analysis apparatus 10 includes the abnormality detection unit 22 that detects the abnormality occurring in the vehicle interior 6 based on the occupant information Ich acquired by detecting the skeleton points SP.

That is, by detecting the skeleton points SP, the physical occupant information Ich such as a posture and a physique of the occupant 5 can be acquired with high accuracy. Thus, based on the acquired occupant information Ich, it is possible to perform, with high accuracy, the detection and determination of the abnormality for the vehicle interior 6 in which the occupant 5 is on board. However, when the hidden state occurs in the captured image Vd, the detection state of the skeleton points SP also deteriorates. As a result, the detection and determination of the abnormality may not be performed with high accuracy. Therefore, a more remarkable effect can be obtained by applying the detection and determination of the hidden state shown in the above (1) to (5) to such a configuration.

(7) The hidden state detection unit 40 includes the determination output unit 80 that performs, as the detection output of the hidden state, the determination output for the detection state of the skeleton points SP in the captured image Vd in which the occurrence of the hidden state is detected, when the occurrence of the hidden state is detected.

According to the above configuration, it is possible to correctly grasp the detection state of the skeleton points SP changed due to the occurrence of the hidden state. Thus, it is possible to appropriately use the captured image Vd in which the hidden state occurs.

The above embodiment can be modified and implemented as follows. The above embodiment and the following modifications can be implemented in combination with each other as long as the embodiment and the modifications are technically not in conflict with each other.

In the above embodiment, the infrared camera is used as the camera 8, but a model thereof may be appropriately changed. For example, a visible light camera or the like may be used.

In the above embodiment, the imaged area 60 of the torso portion is used as the imaged area 50 of the person H in the calculation of the overlap ratio α, but for example, a range of the imaged area 50 used for the calculation of the overlap ratio α may be appropriately changed, such as including a head. In addition, a future time at which the movement prediction and overlap estimation are performed may be appropriately changed. A specific method for the movement prediction may be appropriately changed.

In the above embodiment, the boarding and alighting determination for the occupant 5 is performed with the captured image Vd converted into the top view, but conversion to the top view may not necessarily be performed. For example, when the total number Na of persons in the vehicle interior 6 can be acquired by a method other than the image analysis, such as boarding reservation information, a value in the boarding reservation information may be used.

In the above embodiment, the detected number Nd of occupants 5 imaged in the captured image Vd is calculated based on the detection of the skeleton points SP, specifically, an extraction possibility of the main skeleton points SP, but may not necessarily be based on the detection of the skeleton points SP. The number of occupants 5 recognized in the captured image Vd by using other methods may be used as the detected number Nd of persons. The difference value δ between the total number Na of persons in the vehicle interior 6 and the detected number Nd of occupants 5 may not necessarily be calculated, and match determination may be made simply.

In the above embodiment, the proportion of the imaged area 70 of the occupant 5 imaged in the captured image Vd to the entire captured image Vd is set as the image ratio β, and it is determined that the occupant 5 having the image ratio β equal to or greater than the predetermined proximity determination value βth is imaged in the captured image Vd at the hiding position Px. However, the disclosure is not limited thereto, and the detection and determination of the occupant 5 imaged in the captured image Vd at the hiding position Px may be appropriately changed. That is, as long as it can be specified that when the occupant 5 in the vehicle interior 6 stands at the position in proximity to the camera 8, the occupant 5 blocks the field of view of the camera 8, the specified position of the occupant 5 is the hiding position Px. For example, the image ratio β may not necessarily be calculated, and the camera proximity position determination may be performed by a combination of the size of the imaged area 70 and a use state of an accessory of the vehicle 1 such as the hanging strap or the handrail indicating that the occupant 5 is in the position in proximity to the camera 8.

In the above embodiment, the posture determination for the occupant 5 is performed based on the detection of the skeleton points SP. The abnormality in the vehicle interior 6 imaged in the captured image Vd is detected by detecting the falling posture. However, the disclosure is not limited thereto, and the detection and determination of the abnormality may be performed by using other occupant information Ich acquired by the image analysis of the captured image Vd. Further, the acquisition of the occupant information Ich may be performed regardless of the detection of the skeleton points SP. The acquired occupant information Ich may also be used for applications other than the detection and determination of the abnormality.

In the above embodiment, the monitoring system 15 is formed by connecting the plurality of information processing apparatuses 30, which are disposed inside and outside the vehicle 1, with one another via the information communication network (not illustrated). In the image analysis apparatus 10, the in-vehicle information processing apparatus 30a mounted in the vehicle 1, and the information processing apparatus 30b which is outside the vehicle and constitutes the cloud server 31 perform the image analysis processing in the distributed manner. However, a system configuration of the monitoring system 15 is not limited thereto, and may be appropriately changed. For example, the image analysis apparatus 10 may be mounted in the in-vehicle information processing apparatus 30a mounted in the vehicle 1. Further, the information processing apparatus 30b, which is outside the vehicle and constitutes the cloud server 31, may be disposed in the operation center 32 of the vehicle 1 in which the operator 33 as the administrator 35 is stationed.

Further, for the captured image Vd of the inside of the vehicle interior 6 confirmed by the administrator 35 when the abnormality occurs or the hidden state is detected, the captured image Vd imaged by the camera 8 may be constantly distributed to the administrator 35 outside the vehicle, or may be distributed to the administrator 35 only when an event occurs.

In the above embodiment, the monitoring system 15 is embodied with the monitored space 11 set as the vehicle interior 6 imaged by the camera 8 in the vehicle 1. However, the monitored space 11 is not limited thereto, and may be a room interior of a building. For example, the monitored space 11 may also be set outdoors.

According to an aspect of this disclosure, an image analysis apparatus includes: a person information acquisition unit configured to analyze a captured image of a monitored space imaged by a camera so as to acquire information of a person imaged in the captured image; and a hidden state detection unit configured to detect occurrence of a hidden state in which a plurality of the persons are imaged to overlap in the captured image.

According to the above configuration, it is possible to detect the hidden state occurring in the captured image and grasp a state in which the person in the monitored space is not correctly imaged in the captured image. In this case, for example, information acquisition with high accuracy can be ensured by avoiding analytical use of the captured image in which the hidden state occurs.

According to the above aspect of the disclosure, it is preferable that the image analysis apparatus further includes: a movement prediction unit configured to perform movement prediction for each of the persons imaged in the captured image; and an overlap ratio calculation unit configured to calculate an overlap ratio for an imaged area of each of the persons, the imaged area being estimated, based on the movement prediction, to be imaged to overlap. It is preferable that the hidden state detection unit is configured to perform detection and determination of the hidden state based on a comparison between the overlap ratio and an overlap determination value.

According to the above configuration, the occurrence of the hidden state in the captured image can be detected with high accuracy. Further, the image analysis apparatus has an advantage that the occurrence of the hidden state can be predicted in advance. Thus, the information acquisition can be performed with higher accuracy.

According to the above aspect of the disclosure, it is preferable that the image analysis apparatus further includes a number-of-entering-and-exiting-persons measurement unit configured to measure the number of entering and exiting persons entering and exiting the monitored space, and the hidden state detection unit is configured to perform detection and determination of the hidden state based on a difference between the total number of persons in the monitored space specified by measuring the number of entering and exiting persons and the detected number of persons imaged in the captured image.

That is, when the hidden state does not occur in the captured image, the detected number of persons imaged in the captured image is equal to the total number of persons in the monitored space. Therefore, according to the above configuration, the hidden state occurring in the captured image can be easily detected with a simple configuration.

According to the above aspect of the disclosure, it is preferable that in the image analysis apparatus, the hidden state detection unit is configured to, when the person imaged in the captured image is detected at a hiding position in proximity to the camera, regard that the hidden state occurs.

That is, the hidden state may occur in the captured image in such a manner that the person imaged in the captured image at the hiding position in proximity to the camera blocks a field of view of the camera to hide another person located in the monitored space. In this case, it is not possible to determine whether the hidden state actually occurs. In view of the above description, as in the above configuration, it is regarded that the hidden state occurs. In this case, for example, the information acquisition with high accuracy can be ensured by avoiding analytical use of the captured image in which the hidden state occurs.

According to the above aspect of the disclosure, it is preferable that the image analysis apparatus further includes: an image ratio calculation unit configured to calculate, as an image ratio, a proportion of an imaged area of the person to an entire captured image; and a camera proximity position determination unit configured to, when the person having the image ratio equal to or greater than a predetermined proximity determination value is detected, determine that the person is imaged in the captured image at the hiding position.

According to the above configuration, the person imaged in the captured image at the hiding position in proximity to the camera can be detected with a simple configuration.

According to the above aspect of the disclosure, it is preferable that the image analysis apparatus further includes: a skeleton point detection unit configured to detect a skeleton point of the person included in the captured image; and an abnormality detection unit configured to detect an abnormality occurring in the monitored space based on information of the person acquired by detecting the skeleton point.

That is, by detecting the skeleton point, physical information such as a posture and a physique of the person can be acquired with high accuracy. Thus, detection and determination of the abnormality in the monitored space can be performed with high accuracy based on the acquired information of the person. However, when the hidden state occurs in the captured image, a detection state of the skeleton point also deteriorates. As a result, the detection and determination of the abnormality may not be performed with high accuracy. Therefore, a more remarkable effect can be obtained by applying the detection and determination of the hidden state shown in any of the above configurations to such a configuration.

According to the above aspect of the disclosure, it is preferable that the image analysis apparatus further includes a determination output unit configured to, when the occurrence of the hidden state is detected, perform, as detection output of the hidden state, determination output for a detection state of the skeleton point in the captured image in which the occurrence of the hidden state is detected.

According to the above configuration, it is possible to correctly grasp the detection state of the skeleton point changed due to the occurrence of the hidden state. Thus, it is possible to appropriately use the captured image in which the hidden state occurs.

According to the above aspect of the disclosure, it is preferable that in the image analysis apparatus, the monitored space is a vehicle interior of a vehicle, and the person is an occupant in the vehicle.

According to the above configuration, the information acquisition can be performed with high accuracy for the occupant in the vehicle interior.

According to another aspect of this disclosure, a monitoring system includes the image analysis apparatus according to any one of the above aspects.

According to this disclosure, it is possible to grasp the state in which the person in the monitored space is not correctly imaged in the captured image.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image analysis apparatus comprising:
a camera configured to capture an image of a monitored space;
a memory storing instructions; and
at least one processor configured to execute the instruction to implement:
a person information acquisition unit configured to analyze the captured image of a monitored space imaged by the camera so as to acquire information of a person imaged in the captured image;
a hidden state detection unit configured to detect occurrence of a hidden state in which a plurality of the persons are imaged to overlap in the captured image;

a skeleton point detection unit configured to detect a skeleton point of the person included in the captured image;

an abnormality detection unit configured to detect an abnormality occurring in the monitored space based on information of the person acquired by detecting the skeleton point; and a determination output unit configured to, when the occurrence of the hidden state is detected, transmit to an administrator a detection output of the hidden state, the captured image, and a detection state of the skeleton point in the captured image in which the occurrence of the hidden state is detected.

2. The image analysis apparatus according to claim 1, further comprising:

a movement prediction unit configured to perform movement prediction for each of the persons imaged in the captured image; and an overlap ratio calculation unit configured to calculate an overlap ratio for an imaged area of each of the persons, the imaged area being estimated, based on the movement prediction, to be imaged to overlap, wherein the hidden state detection unit is configured to perform detection and determination of the hidden state based on a comparison between the overlap ratio and an overlap determination value.

3. The image analysis apparatus according to claim 1, further comprising:

a number-of-entering-and-exiting-persons measurement unit configured to measure the number of entering and exiting persons entering and exiting the monitored space, wherein the hidden state detection unit is configured to perform detection and determination of the hidden state based on a difference between the total number of persons in the monitored space specified by measuring the number of entering and exiting persons and the detected number of persons imaged in the captured image.

4. The image analysis apparatus according to claim 1, wherein the hidden state detection unit is configured to, when the person imaged in the captured image is detected at a hiding position in proximity to the camera, regard that the hidden state occurs.

5. The image analysis apparatus according to claim 4, further comprising:

an image ratio calculation unit configured to calculate, as an image ratio, a proportion of an imaged area of the person to an entire captured image; and a camera proximity position determination unit configured to, when the person having the image ratio equal to or greater than a predetermined proximity determination value is detected, determine that the person is imaged in the captured image at the hiding position.

6. The image analysis apparatus according to claim 1, wherein the monitored space is a vehicle interior of a vehicle, and the person is an occupant in the vehicle.

7. A monitoring system, comprising the image analysis apparatus according to claim 1.

* * * * *